Jan. 28, 1958
T. R. CROMPTON
2,821,431
END GATE MOUNTING FOR TRUCK BODIES
Filed Aug. 24, 1956
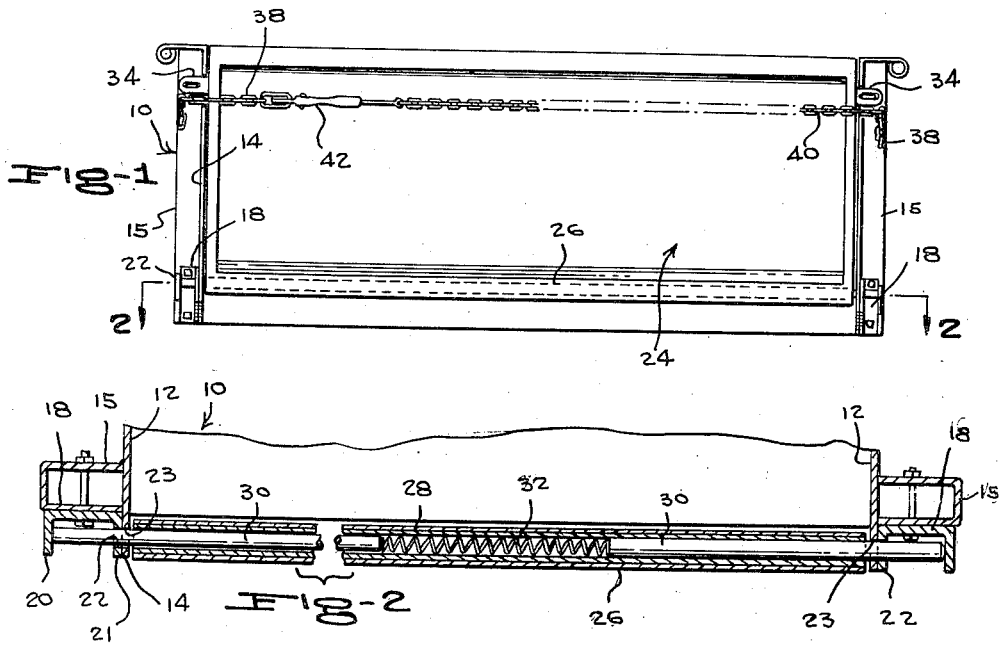
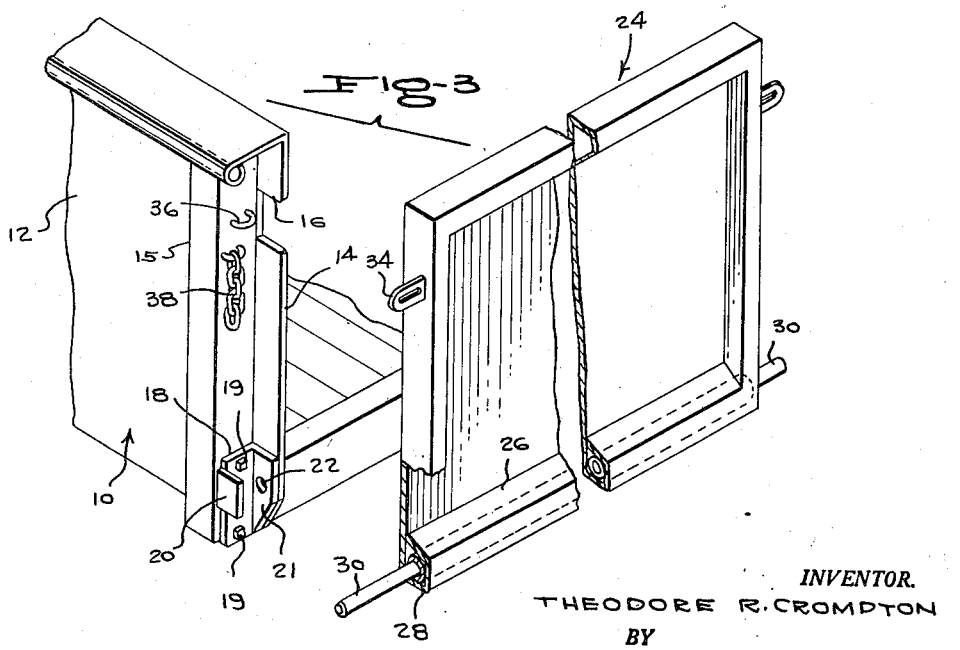
INVENTOR.
THEODORE R. CROMPTON
BY
McMorrow, Berman + Davidson
ATTORNEYS United States Patent Office 2,821,431
Patented Jan. 28, 1958

2,821,431
END GATE MOUNTING FOR TRUCK BODIES
Theodore R. Crompton, Evanston, Wyo.
Application August 24, 1956, Serial No. 606,066
1 Claim. (Cl. 296—57)

This invention relates to a construction for end gates of trucks, wagons, etc., so designed as to provide a hinged mounting for the end gate, in an arrangement such as to permit the end gate to be completely detached from the associated bed or body of the vehicle, or hingedly attached to the vehicle, with maximum speed and ease.

One object of importance is to provide end gate fastening or mounting means so designed as to permit one to change an end gate or tail gate of a truck or similar vehicle in no more than a very few minutes, due to the complete elimination of the nuts, bolts, etc. presently employed.

Another object is to provide an end gate fastener construction such that when used during the loading of stock, it will offer full protection against tipping or tilting should the livestock walk upon the edge of the gate, thus protecting an animal from sustaining leg injuries during loading.

Another object is to provide an end gate fastener device so designed that the fastener means can be incorporated in end gates and associated vehicles already in use, with a minimum of expense and difficulty.

Still another object is to provide an end gate fastener construction which will be designed for use on any of various types or makes of express or stock beds of vehicles.

Still another object is to provide an end gate construction wherein a removable, hinge type fastener will automatically move to and remain in position to hingedly connect the end gate to the associated vehicle body, with said fastener being designed, however, to be readily retracted at one end so as to permit the swift disconnection of the end gate from the vehicle.

Still another object is to provide an end gate fastener means that will be designed in such a manner as to permit its manufacture at low cost, from a minimum number of parts readily attachable to the conventional vehicle and to an end gate.

Other objects will appear from the following description, the claim appended thereto, and from the annexed drawing, in which like reference characters designate like parts throughout the several views, and wherein:

Figure 1 is an elevational view of an end gate mounted on a vehicle through the use of a fastener formed according to the present invention;

Figure 2 is a fragmentary plan sectional view on an enlarged scale, taken substantially on line 2—2 of Figure 1; and Figure 3 is an enlarged, fragmentary, exploded perspective view of the end gate and of the associated portion of the truck.

Referring to the drawings in detail, designated generally at 10 is a truck bed including side walls 12 the rear ends of which define rearwardly projecting flanges 14. Fixedly secured to the outer surfaces of the side walls 12 are vertically extending reinforcing channels 15, spaced inwardly from the outer edges of the flanges 14. The flanges 14, adjacent their upper ends, are formed with deep, rectangular notches 16.

Retaining brackets 18 are bolted at 19, or otherwise fixedly secured, to the flanges 14 and reinforcing channels 15. The brackets have one leg bearing against the outer surfaces of the flanges 14, with the other legs of the brackets bearing against the forwardly facing wall of the channels 15.

On the outer edges of the brackets 18, there are formed rearwardly projecting ears 20, disposed in planes parallel to the inner legs 21 of the brackets.

Formed in the inner legs 21 of the brackets are openings 22, registering with openings 23 formed in the flanges 14 (see Figure 2).

The end gate has been generally designated 24, and at its lower end has a rolled flange 26, defining a tubular housing that extends fully from one to the opposite side edges of the end gate.

Welded or otherwise fixedly engaged in the tubular housing 26 is an elongated sleeve 28 which, as shown in Figure 2, extends the full length of the housing. Slidably telescoping in the opposite ends of sleeve 28 are elongated hinge pins or rods 30, the inner ends of which are spaced apart at the midlength portion of the sleeve. A compression, coil spring is disposed in the space between the inner ends of the rods 30, and is held under compression in said space, so as to normally bias the rods in an axial direction away from each other.

By reason of this arrangement, the outer ends of the rods 30 will be spring biased through the registering openings 22, 23, into engagement with the inner surfaces of the ears 20, which comprise stops disposed in the paths of axial movement of the rods. This causes the end gate to be hinged upon the side walls of the truck bed, to swing between its normal open and closed positions.

Secured to the upper end portions of the reinforcing channels 15 are rearwardly projecting eyes 36. Projecting outwardly from the sides of the end gate 24, adjacent the top of the end gate, are ears 34 slotted to receive the eyes 36. The recesses 16 provide clearance spaces through which the ears 34 may pass when the end gate swings to closed position.

Also fixedly secured to the reinforcing channels 15, below the eyes 36, are eyes from which depend chains 38, 40 respectively. The chains 38, 40 are adapted to extend in back of the end gate when the end gate is in closed position, and are provided with cooperating elements forming a connector 42 of the type including a pivoted handle which, when swung to its Figure 1 position, holds the ends of the chains 38, 40 detachably connected, while tensioning the chain across the back surface of the end gate.

It will be seen that the end gate 24 includes the conventional plate-like body, and the conventional, tubular, peripheral flange thereon. In other words, the rolled flange 26 at the bottom of the end gate is part of a conventional end gate construction, considered per se, and also part of the conventional end gate construction are ears 34, the eyes 36 of the truck bed, and the side walls 12 having flanges 14 and reinforcing channels 15. The invention comprises the specially formed brackets 18, the sleeve 28 engaged in the tubular housing, and the particular formation and relative arrangement of the rods 30 and spring 32, relative to the sleeve 28 and to the brackets 18.

By use of the invention, decided advantages are secured with respect to the attachment or detachment of the end gate. One can change the end gate or tail gate of a truck in a few minutes, it has been found in actual practice of the invention, due to complete elimination of nuts, bolts, etc. One need merely employ a tool such as a screw driver, for the purpose of pushing one of the rods 30 inwardly into the sleeve 28, until the projecting or outer end of the rod has been pressed inwardly beyond the openings 22, 23. This detaches the end gate at one side, and it is then merely necessary that the entire gate be shifted laterally in a direction away from the other side, thus to pull the other pin out of the openings 22, 23 at said other side of the truck bed. Attachment of the end gate to the truck bed is effected with similar speed and ease.

When the invention is used with the chain and connector, all side pressure is taken from the standard reinforcing channels 15, and further, the end gate is effectively held in place when in its upwardly swung or closed position.

A further advantage in connection with the invention resides in the fact that it is designed for any make of express or stock beds, whether large or small, and when used on stock beds eliminates the hazard of injury to the animals' legs. This is true because the end gate cannot be released by pressure on either end, as distinguished from the attaching mechanisms employed in connection with conventional stock end gates. This is achieved while still maintaining the construction at an economic level, through the provision of simply formed and arranged components of the device.

It is believed apparent that the invention is not necessarily confined to the specific use or uses thereof described above, since it may be utilized for any purpose to which it may be suited. Nor is the invention to be necessarily limited to the specific construction illustrated and described, said construction only being intended to be illustrative of the principles of operation and the means of carrying out said principles, it being considered that the invention comprehends any minor change in construction that may be permitted within the scope of the appended claim.

What is claimed is:

An end gate and truck bed construction comprising: side walls on said bed; vertical reinforcing channels fixedly secured to the side walls and spaced closely from the rear ends of the side walls, the side walls having notches opening upon said rear ends and extending in depth fully to the channels; angular retaining brackets fixedly secured to the channels downwardly from the notches, each bracket having one leg bearing against the adjacent side wall and another leg bearing against the adjacent channel, said brackets having, in transversely spaced relation to said one leg, a rearwardly projecting ear disposed in a plane parallel to that of said one leg, the side walls and said one leg having registering openings; an end gate extending between the side walls and formed at its lower end with a rolled flange; elongated hinge pins axially slidable within and projecting at one end beyond the corresponding ends of said housing, the inner ends of said pins being spaced apart at the midlength portion of the sleeve; a compression, coil spring in the space between the inner ends of the pins exerting pressure on the pins tending to normally bias the same outwardly of the housing through the registering openings for hingedly connecting the end gate to the truck bed, said ears being in the path of outward axial movement of the pins to provide abutments limiting the pins against outward movement beyond a predetermined position of the pins in which the end gate is supported for swinging movement between a normally closed and an open position, said gate in its closed position lying abreast of the notches of the side walls; eyes secured to the respective channels adjacent the notches; ears extending outwardly from the end gate through the notches, slotted to receive the eyes in the closed position of the end gate; and a flexible element releasably connectible between the channels in back of the closed end gate and extending through said notches.

References Cited in the file of this patent

UNITED STATES PATENTS

| | | |
|---|---|---|
| 457,274 | Hall | Aug. 4, 1891 |
| 888,286 | Wilhite | May 19, 1908 |
| 1,402,892 | Reinl | Jan. 10, 1922 |
| 2,707,650 | Lawton | May 3, 1955 |
| 2,742,317 | Chandler | Apr. 17, 1956 |